Patented July 31, 1934

1,968,176

UNITED STATES PATENT OFFICE 1,968,176

FERTILIZER

Walter Schoeller and Max Dohrn, Berlin-Westend, and Hans Goebel, Berlin-Reinickendorf, Germany, assignors to Schering-Kahlbaum A. G., Berlin, Germany No Drawing. Application February 9, 1931, Serial No. 514,698. In Germany February 10, 1930

7 Claims. (Cl. 71—9)

Our invention refers to fertilizers and has for one of its objects to provide a new kind of fertilizers and/or stimulating agents for fertilizers.

We have found that sexual hormones and other substances acting similarly to sexual hormones and which may be recovered from animal or vegetable starting materials or may be produced by synthetical methods including the derivatives thereof and more particularly the substances having an action similar to that of sexual hormones and also the vegetable sex principle, which besides the known sexual hormones also contains other growth stimulating agents, such as for example the auxin (Kögl, in "Chemisch Weekblad", vol. 29, No. 21 (1932) and Went, in "Zeitschrift für angewandte Chemie", No. 45, (1932), p. 392) are capable of stimulating and furthering the growth of plants of all kinds. In consequence of this property all these substances are adapted to be used as fertilizers as well as stimulating agents for fertilizers.

Instead of the female sexual hormones also other hormones can be used for this purpose, if desired, in combination. We prefer using the gonades hormones and of the female hormone both modifications, the theelin $C_{18}H_{22}O_2$ and the oestrine $C_{18}H_{24}O_3$ described by Marriam in Biochemical Journal (1930) vol. 24, p. 435, or mixtures thereof. The male hormone isolated according to the methods described by Koch, Moore and Gallagher (Chicago) from the testicles or the urine of young men has a similar action. The materials thus isolated need not be pure and we have even found that it may be preferable to use them in crude state.

If it is a question of gardening, where the plants can be influenced by watering, we prefer using hormones having a certain degree of purity, as these hormones have been found to be superior to solutions of chemically pure hormones by being less influenced by the action of air and light. When producing fertilizers we may even use the hormones in relatively crude condition, in which their natural by-products are still present, because in this case the water in the soil causes the hormone to gradually spread, so that a longer action of the hormone is obtained.

We use the hormones or similar substances in a state of admixture, adsorption or chemical combination with artificial fertilizers, and we may admix to them suitable diluting agents or materials rendering them more readily strewable.

Various changes may be made in the details disclosed in the foregoing specification without departing from the invention or sacrificing the advantages thereof.

We claim:—

1. A fertilizer and stimulating agent for plant growth being a mixture of an artificial fertilizer and an isolated sexual hormone-like substance.

2. A fertilizer and stimulating agent for plant growth being a mixture of an artificial fertilizer and an isolated sexual hormone.

3. A fertilizer and stimulating agent for plant growth being a mixture of an artificial fertilizer and an isolated impure sexual hormone product.

4. A fertilizer and a stimulating agent for plant growth being a mixture of an artificial fertilizer and an isolated female sexual hormone.

5. A fertilizer and a stimulating agent for plant growth being a mixture of an artificial fertilizer and the hormone known as theelin $C_{18}H_{22}O_2$.

6. A fertilizer and a stimulating agent for plant growth being a mixture of an artificial fertilizer and the hormone known as oestrine $C_{18}H_{24}O_3$.

7. The method of stimulating plant growth comprising adding to the stratum in which the plants are rooted a mixture of an artificial fertilizer and a sexual hormone-like substance.

WALTER SCHOELLER.
MAX DOHRN.
HANS GOEBEL.